United States Patent [19]

Noetzel

[11] Patent Number: 5,068,816

[45] Date of Patent: Nov. 26, 1991

[54] INTERPLATING MEMORY FUNCTION EVALUATION

[76] Inventor: Andrew S. Noetzel, 59 Sunnyside Dr., Yonkers, N.Y. 10705

[21] Appl. No.: 480,970

[22] Filed: Feb. 16, 1990

[51] Int. Cl.$^5$ .............................................. G02F 7/38
[52] U.S. Cl. ................................... 364/718; 364/748; 364/723
[58] Field of Search ............... 364/718, 719, 720, 721, 364/723, 748

[56] References Cited

U.S. PATENT DOCUMENTS

| | | | |
|---|---|---|---|
| 4,482,974 | 11/1984 | Kovalick | 364/718 |
| 4,482,975 | 11/1984 | King et al. | 364/718 |
| 4,536,853 | 8/1985 | Kawamoto et al. | 364/718 |
| 4,710,891 | 12/1987 | Debus, Jr. et al. | 364/718 |

OTHER PUBLICATIONS

John N. Mitchell, Jr., "Computer Multiplication and Division Using Binary Logarithms", IRE Transactions on Electronic Computers, 512–5178 (U.S.A. 1962).
Combet et al., "Computation of the Base Two Logarithm of Binary Numbers", IEEE Transactions on Electronic Computers, 865–867 (U.S.A. 1965).
Hall et al., "Generation of Products and Quotients Using Approximate Binary Logarithms for Digital Filtering Applications", IEEE Transactions on Computers, 19:2, 97–105 (U.S.A. 1970).
Marino, "New Algorithms for the Approximate Evaluation in Hardware of Binary logartihms and Elementary Functions", IEEE Transactions on Computers, 1417–1421.
Brubaker et al., "Multiplication using Logarithms Implemented with Read-Only Memory", IEEE Transactions on Computers, 761–765 (U.S.A. 1975).
Swartzlander, Jr. et al., "The Sign/Logarithm Number System", IEEE Transactions on Computers, 1238–1242 (U.S.A. 1978).
Lee et al., "The Focus Number System", IEEE Transactions on Computers, 26:11, 1167–1170 (U.S.A. 1970).
Edgar et al., "Focus Microcomputer Number System", Communications of the ACM, 22:3, 166–177 (U.S.A. 1970).
Lo et al., "Programmable Variable-Rate Up/Down Counter for Generating Binary Logarithms", IEEE Proceedings, 131:4, 125–131 (U.S.A. 1984).
Lo et al., "Generation of a Precise Binary Logarithm with Difference Grouping Programmable Logic Array", IEEE Transactions on Computers, 34:8, 681–691 (U.S.A. 1985).
Lo et al., "A Hardwired Generalized Algorithm for Generating the Logarithm Base-k by Iteration", IEEE Transactions on Computers, 36:11, 1363–1367 (U.S.A. 1987).
Waser, "High-Speed Monolithic Multipliers, for Real-Time Digital Signal Processing", IEEE Transactions on Computers, 19–29 (U.S.A. 1978).

*Primary Examiner*—Gary V. Harkcom
*Assistant Examiner*—Long T. Nguyen
*Attorney, Agent, or Firm*—James Creighton Wray

[57] ABSTRACT

A technique for the evaluation of a general continuous function f(x) is presented, and the design of an interpolating memroy, an implementation of the technique, is described. The technique partitions the domain of f(x) into segments, and defines an interpolating (or approximating) function for each. The implementation is a memory subsystem that holds the parameters of the approximating functions and yields an interpolated function value on each read reference. Polynomial interpolating functions are considered in particular. Hardware requirements (memory and computational logic) are analyzed in terms of the required precision. It is shown that as long as f(x) has d+1 derivatives, and d is the degree of the interpolating polynomial, d+1 additional bits of precision of the computer f(x) are obtained for each additional address bit used in the interpolating memory. This establishes a tradeoff between memory and computational logic, which can be exploited in the design of a unit for a specific function, for any precision requirement. Furthermore, a single unit may be designed for any class of functions that have the required derivatives. Two examples of implementations for particular functions are presented.

5 Claims, 5 Drawing Sheets

ERROR OF $\log_2 x$ WITH LINEAR INTERPOLATION

MAXIMUM ERROR (LOG SCALE) VERSUS ADDRESS BITS k

INTERPLATING MEMORY FUNCTION EVALUATION

BACKGROUND OF THE INVENTION

Several computer applications—digital signal processing in particular—require the repeated evaluation of a few specific functions. Usually, function values are obtained by computing the terms of a series to the required degree of precision. But this may be unacceptably slow, especially when there are real-time constraints. Alternative solutions are either table-lookups or special-purpose arithmetic units. But the table-lookup approach is useful only for limited-precision applications, since the table size grows exponentially with the argument precision, and special-purpose hardware designed for each required function may be expensive and inflexible.

A number of previous works have reported on the design of special-purpose hardware for the evaluation of particular functions. The base-two logarithm and exponential have been the functions most considered, because of the usefulness of the logarithmic transformation in multiplication, division, and exponentiation.

The work of Mitchell is a fundamental exposition of the idea of implementing the log function in hardware. Any positive number y can be written in the form $y = 2^k x$, where k is an integer and x is between one and two. Mitchell proposes using the straight line $x - 1$ as an approximation to $\log_2 x$ for $1 \leq x \leq 2$. But the straight-line approximation has a maximum absolute error of 0.086 in the interval. This can lead to an error of 11.1 percent for multiplication implemented by logarithms.

Combet et al. propose using several straight-line segments for the approximation of $\log_2 x$. The coefficients of the linear segments are selected for efficient implementation in hardware as well as reduction of the maximum error. The study results in a hardware design that uses four segments, reducing the maximum error to 0.008.

Hall, Lynch, and Dwyer also propose the piecewise linear approximation to the logarithm, as well as to the exponential. Their analysis is based on the minimization of the squared error. Numerical results are shown for approximations by up to eight segments. The maximum error of the least-squares linear approximation to $\log_2 x$ is shown to be 0.065 for one segment, and 0.0062 for four segments (compare to the cases above). For eight segments, the error is 0.00167 - approximately a fourfold reduction over the four-segment case. The use of the log-exp transformation is shown for a digital filter, requiring 6-bit precision.

A work by Marino considers the use of two second-degree polynomial segments to approximate $\log_2 x$. The computation of $x^2$ is approximated in order to reduce it to adding and shifting operations. A maximum absolute error of 0.0040 is achieved for $\log_2 x$.

Brubaker and Becker analyze the evaluation of logarithms and exponentials by ROM table-lookup without interpolation. They consider multiplication by direct table-lookup and by the addition of logarithms. Their highest precision example is a multiplication with an error of 0.1 percent, in which the operands are 11 bits and the product 10 bits. In this case, the memory required for multiplication via logarithms is smaller by a factor of 50 than that required for direct table-lookup.

Several studies have shown the effectiveness of the logarithm form of number representation, both for fast and significant computation, and for efficient use of storage. But the practical usefulness of logarithmic representation schemes depends critically on efficient conversions through the logarithm and exponential functions.

A recent work by Lo and Aoki shows how these functions can be evaluated quickly through the use of a programmable logic array (PLA). Their scheme is to use the single-segment linear approximation for $\log_2 x$ for $1 \leq x \leq 2$, but then to add error-correcting values obtained from a PLA. The error corrections, truncated to the precision required of the result, are found to be constant in intervals of x. Economy in the required PLA size is obtained by encoding it to provide corrections for each group of x values. The speed of this technique is significant: the result is obtained after only two logic levels in the PLA, followed by one addition.

The same authors have also demonstrated iterative techniques for the evaluation of the logarithm. These methods are implemented with a smaller hardware investment, but are correspondingly slower.

SUMMARY OF THE INVENTION

This invention provides a function evaluator which uses an interpolating memory for evaluating functions. An argument is expressed in digital bits. High order bits are used to address a memory for selecting coefficients. Low order bits are used in combinational logic to supply powers which multiply the coefficients. An adder sums the products of the multipliers, and the summation is the function evaluation.

Floating point arguments with exponents and mantissas in digital form are used with the system. Low order bits of the exponent or high order bits of the mantissa or both are supplied to the decoder of a set-associative memory to select a set. An associative search is made by a function representation and high order bits of the exponent.

A memory word selected in the search contains an exponent and coefficients. The coefficients are supplied to an evaluator which is similar to that previously described, and the summation from that evaluator and the exponent are supplied to a normalizer. The output of the normalizer is the function evaluation.

The invention is an interpolating memory, a digital electronic device, capable of quickly evaluating mathematical functions. In its operation, it evaluates a selected polynomial approximation to the desired function.

The hardware consists of:
a) A memory bank containing the coefficients of the approximating polynomials, which is addressed by k bits of the argument x;
b) Combinational logic for computing the values $t^2$, $t^3, \ldots, t^d$ given the variable t;
c) A set of parallel multipliers for computing the terms of the polynomial; and
d) An adder to sum the terms of the polynomial.

A second embodiment accepts floating-point arguments and produces floating-point function values, over the domain of all floating-point numbers. It can hold the coefficients of several functions at once.

The second embodiment has the following extensions:
a) The input argument x is in floating-point form with exponent E and mantissa M.
b) A function identification f is provided as an input.

c) A set-associative memory is used to select the memory word containing the polynomial coefficients. The associative memory set is selected by k bits taken from both the low-order bits of E and the high-order bits of M.
d) An associative search is made, with f and the high-order bits of E constituting the search key, within the selected set of associative memory register to select the memory word containing an exponent and the polynomial coefficients.
e) Polynomial coefficients are multiplied with powers of the low order bits of M.
f) The memory word that holds the polynomial coefficients also holds a floating-point exponent
g) A floating-point normalization takes place after the polynomial evaluation.

The present invention provides the basic concept of the interpolating memory--the parallel hardware evaluation of polynomial segments selected by bits of the argument. The floating-point embodiment includes details that make it more useful.

The present invention provides a generalized function evaluation unit that combines table-lookup and arithmetic logic. A tradeoff between memory size and amount of combinational logic allows a designer for a particular application to select among various configurations. The generalized unit can yield values for a broad class of functions.

An interpolating memory apparatus includes a memory bank containing coefficients of approximating polynomials, combinational logic for computing powers of a given variable, plural multipliers for multiplying the powers of the variable and the polynomial coefficients, and an adder connected to outputs of the multipliers for summing the products of the powers of the variable and the coefficients of the polynomial. The sum is the functional evaluation.

The interpolating memory function evaluation includes the parallel evaluation of polynomial segments selected by bits of the function argument.

The preferred method uses bits of a function argument to address a memory holding coefficients and uses other argument bits in combinational logic in parallel with the addressing of the memory. The invention multiplies in parallel coefficients from the memory and sequential powers of the argument bits obtained from the combinational logic and combines the products in an adder.

The function evaluation includes using a binary representation of a number, addressing a memory with one part of the representation and supplying another part of the representation to combinational logic units in parallel with the memory, supplying coefficients from the memory to parallel multipliers and supplying values from the combinational logic to the multipliers, obtaining products, adding the products and thereby producing a function evaluation.

When used with a floating point argument, a binary function identification is supplied to a set-associative memory. The exponent and the mantissa of a floating point argument are expressed in binary terms. Addressing the associative memory with low order bits of the exponent or high order bits of the mantissa or both selects a set of associative memory registers. Supplying the function identification and the high order bits of the exponent to the set-associative memory makes an associative search in the selected set of associative memory registers, and, upon finding a match, selects a word of polynomial coefficients and an exponent as outputs from the memory. Coefficients of the word and lower order bits of the mantissa are supplied in parallel to a polynomial evaluator, as previously described.

The exponent from the word and the output of the polynomial evaluator are supplied to a floating-point normalization unit. An output of the floating-point normalization unit provides the function evaluation.

In a preferred method, an exponent and mantissa register or bus receives an input floating-point argument. A function representation register or bus receives a function representation A set-associative memory has a function input connected to the function register or bus and has an exponent input connected to receive high order bits from the exponent register or bus. A decoder connected to the exponent and mantissa register or bus section receives either or both of low order bits from the exponent and high order bits from the mantissa. According to that input, the decoder of the set-associative memory selects a memory set. An associative search is made in that set with the function input bits and the high order bits from the exponent register or bus. The search selects from the set-associative memory a word having a floating-point exponent and having polynomial coefficients. A polynomial evaluator multiplies the polynomial coefficients with values consisting of the low order bits from the mantissa register or bus raised to integer powers. A floating-point normalization unit is supplied with the floating-point exponent from the memory and to the summed output of the polynomial evaluator and produces a function evaluation.

In one form of the apparatus a floating-point interpolating memory has a function binary representation input and a floating-point argument register. The floating-point argument register has an exponent section and a mantissa section. A set-associative memory has an address input and an associative search key input. The function identification and high order bits in the exponent section are connected to the search key input of the set-associative memory. An address decoder in the set-associative memory receives low order bits from the exponent section, high order bits from the mantissa section, or both. A memory unit is connected to the output of the set-associative memory. The memory unit holds a floating-point exponent and polynomial coefficients. A polynomial evaluator, as previously described, is connected to plural polynomial coefficient outputs from the memory unit. The polynomial evaluator has an input connected to receive low order bits from the mantissa section. A floating-point normalization unit receives an output from the polynomial evaluator and an output of the floating-point exponent output of the memory unit. The floating-point normalization unit has an output which supplies the function evaluation.

A preferred method of evaluating floating-point function values includes inputting a function identification f, inputting a floating-point argument x in a binary representation having exponent E and mantissa M, supplying the function identification f input to a set-associative memory, supplying high order bits of E to a set-associative memory, supplying low order bits of E and/or high order bits of M to a set selector for selecting a memory set from the set-associative memory, making an associative search in the selected set with f and the high order bits of E, selecting a memory word containing a floating point exponent and polynomial coefficients from the selected associative memory set, supplying parallel outputs of the polynomial coefficients to a polynomial evaluator, supplying low order bits of M to the polynomial evaluator, supplying the floating-point exponent to a floating-point normalization unit, supplying an output of the polynomial evaluator to the floating-point normalization unit and supplying a function evaluation output from the normalization unit.

Broadly stated, the interpolating memory function evaluation method of the present invention comprises accessing a memory unit by using specified bits of a function argument for the memory unit address, obtaining parameters of an approximating function from the memory unit, and evaluating, using other specified bits of the argument, the specific approximating function whose parameters were obtained from the memory unit.

The preferred accessing comprises using k bits of the function argument to address the memory unit. The memory unit contains polynomial coefficients. The evaluating comprises evaluating with fixed combinational logic the degree d-polynomial whose coefficients are obtained from the memory unit, using as the polynomial argument the bits of the function argument of lower order than the k bits used to address the memory unit.

The preferred evaluation of the polynomial is performed using as an input to the polynomial evaluator the value t comprised of bits of the function argument of lower order than the k bits used to address the memory unit, computing the quantities $t^2, t^3, \ldots t^d$ in fixed combinational logic, computing the terms of the polynomial in a set of multipliers operating in parallel, whose inputs are the coefficients obtained from the memory unit and the powers of t, and adding the terms of the polynomial.

The system accepts a floating-point function argument, with exponent field E and mantissa M, and using k function argument bits, including zero or more low order bits of E and zero or more high order bits of M as an address of a register set in a set-associative memory. An associative search is performed in the associative memory set selected by the address, using the high order bits of E as the associative search key, obtaining from the memory location associated with a successful match in the associative memory, a floating-point exponent of a function value and the d+1 polynomial coefficients. The polynomial specified by the coefficients is evaluated with the polynomial argument specified as the low-order bits of M. The function evaluation is obtained by normalizing the floating-point value consisting of the exponent obtained from the memory and the mantissa obtained as a result of the polynomial evaluation.

The particular function to be evaluated is supplied as a function identification f, and the associative search key is comprised of both f and the high order bits of E.

These and other and further objects and features of the invention are apparent in the disclosure which includes the above and ongoing specification and claims and drawings.

DETAILED DESCRIPTION OF THE DRAWINGS

Figure 1:
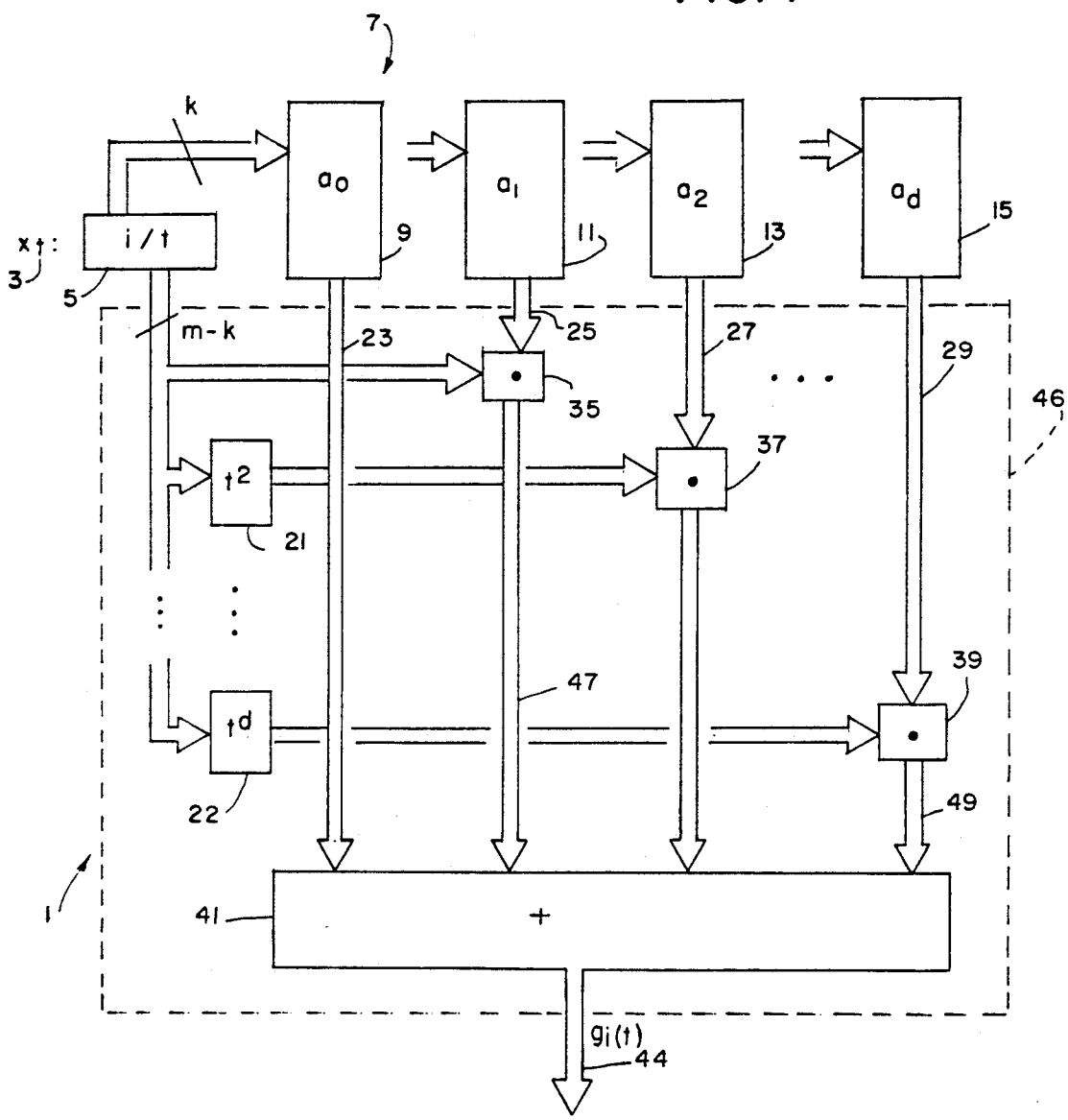
FIG. 1 is a schematic representation of an interpolating memory function evaluation.

FIG. 1 schematically represents an interpolating memory generally indicated by the numeral 1. The argument 3 is input to a register 5 as high order bits and lower order bits. A number k of high order bits from register 5 are used as address i of the memory unit 7. The memory word is composed of d fields, each of which holds a polynomial coefficient 9, 11, 13 . . . 15. Low order bits from register 5 represent the variable t, of which increasing powers are supplied by combinational logic units 21 . . . 22. The memory word supplies the appropriate coefficients $a_0 \ldots a_d$ to outputs 23, 25, 27 . . . 29. The outputs are connected appropriately in parallel to multipliers 35, 37 . . . 39. The multipliers are supplied with powers of t from the combinational logics 21 . . . 22. The outputs 47 . . . 49 of the multipliers are supplied to adder 41. The output coefficient 23 from the memory is supplied directly to adder 41. The output 44 of the adder provides the function evaluation. The function evaluator is generally represented by the numeral 46.

Figure 4:
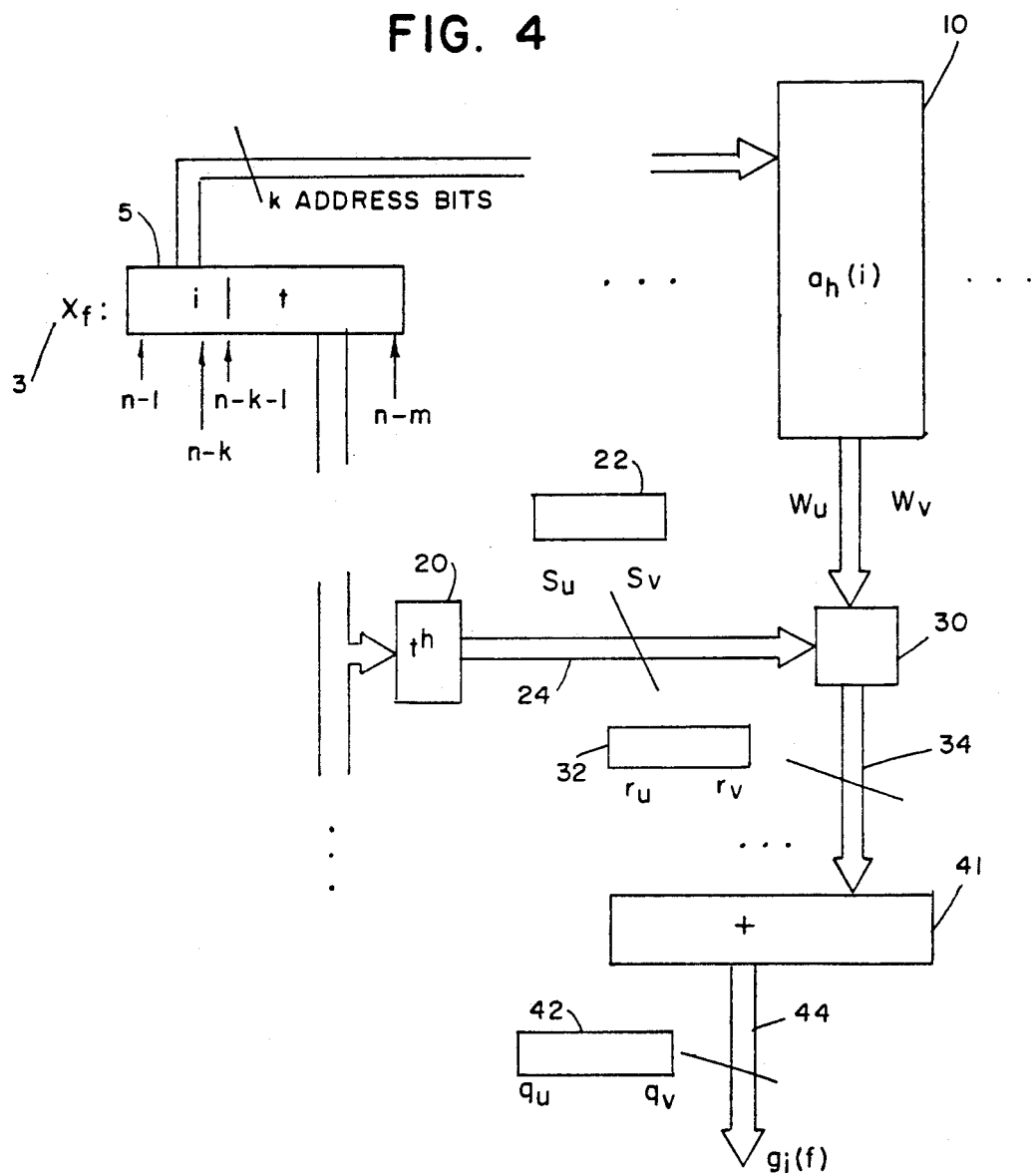
FIG. 4 is a schematic representation of parameters for hardware requirements.

FIG. 4, as later will be described is a schematic representation of the required hardware. The numbers n-1, n-k, and n-m represent the bit positions in register 5. 10 represents one field of the memory word. 20 is an example of the combinational logic units. 30 is an example of the multipliers. Rectangles 22, 32 and 42 are representative of bit positions in the respective words on the busses 24, 34 and 44.

Figure 5:
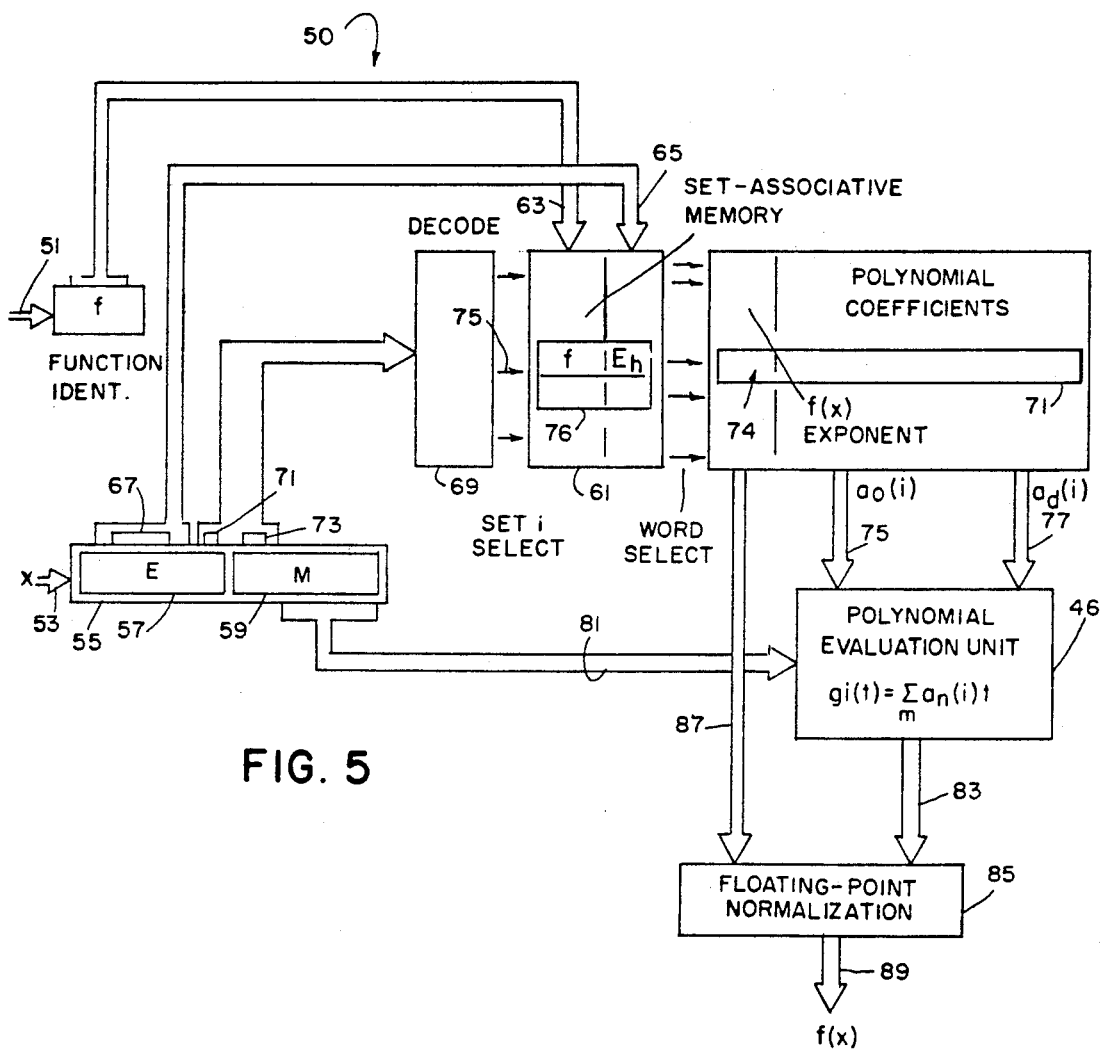
FIG. 5 is a schematic representation of a floating point interpolating memory.

FIG. 5 represents a floating point interpolating memory 50 having a function identification input 51 and an input 53 for argument x, expressed as an exponent 57 and an mantissa 59, in an input register 55. A set-associative memory 61 is connected to a function identification bus 63 and an exponent bus 65, which provides high order bits 67 from the exponent 57 in register 55.

A decoder 69 of the set-associative memory 61 receives low order exponent bits 71 and high order mantissa bits 73. The outputs 75 of the decoder select a particular set 76 of associative memory registers. The associative search is made with the function input 63 and the high order bits of the exponent input 65. If the selected set contains values of f on bus 63 and the high order exponent bits on bus 65, the corresponding memory word 71 is selected. The memory word 71 holds a floating point exponent 73 of the identified function and also holds the coefficient 9, 11, 13 and 15, as shown in FIG. 1. Parallel outputs 75 through 77 of the coefficients in word 71 are supplied to a polynomial evaluator 46 (as shown in FIG. 1), which also receives low order bits on bus 81 from the mantissa M in register 55 (5 in FIG. 1). The results supplied to output 83 is the summation of the products of the coefficients and the powers of the low order bits of M. The floating point normalization occurs in normalization unit 85, which also receives an input from bus 87 of the floating point exponent 73. Result 89 is the floating point representation of the evaluated function.

I. OUTLINE OF THE DESCRIPTION

In this study, we consider a general technique that combines the table-lookup (memory) and computational (arithmetic logic) approaches to function evaluation. The hardware realization of the technique will be called an interpolating memory. It is in essence a memory unit that contains a subset of the required valued of f(x) together with the means of interpolating additional function values on each read reference. We study the particular case of interpolation by polynomial segments.

The analysis shows how the error and hence the precision of the result varies with the interpolating memory size, and with the degree of the interpolating polynomial.

The main result is that the precision of the computed f(x) is a linear function of the number of address bits. If an interpolating polynomial is of degree d, each additional address bit provides d+1 additional bits of precision of the f(x) value. This unifies and generalizes the earlier results on table-lookup and linear and second-degree approximations. It leads to a convenient rule by which a design for a given degree of precision may be chosen by trading off memory and arithmetic logic.

Furthermore, this result is shown to hold for any function that has d+1 derivatives. Hence, if the interpolating memory is implemented with RAM, it can be used for $x^{-1}$ (obviating the need for division hardware), for trigonometic functions, for general functions computed by Fourier series, etc., as well as for the logarithm and exponential. A generalized design must have bit widths in the memory and arithmetic logic that are sufficient for each function. A method for determining these hardware requirements is presented.

In Section II, the design of the generalized interpolating memory is outlined. In Section III, I discuss the error and precision of f(x), and show the error characteristic (in terms the number of address bits) of the log, exp, and sine functions. In Section IV, I show that the upper bound of the error holds in theory, for all functions that have a sufficient number of derivatives. In Section V, I derive the total hardware requirements - memory size and data width of the memory and arithmetic units - for a given precision. In Section VI, two particular examples of interpolating memory design are presented. Section VII compares the timing and hardware requirements to other techniques. Our conclusions are in Section VIII.

II. FUNCTION EVALUATION BY APPROXIMATING SEGMENTS

Consider the evaluation of a function f(x) over the evaluation interval $a \leq x < b$, where $a = c2^n$ and $b = (c+1)2^n$, for arbitrary integers c and n. If the desired interval for an application does not meet these conditions, the smallest subsuming interval that does may be chosen. Let $x_f = x - a$. The binary representation of $x \in [a, b)$ may be partitioned as follows: the higher order bits (bit n and higher) represent the constant $a2^{-n}$, and the lower order bits represent $x_f \in [0, 2^n)$. If function values are to be obtained at $2^m$ points in the evaluation interval, $x_f$ must be specified with a precision of at least m bits.

In the technique of the interpolating memory, the evaluation interval is partitioned in to $2^k$ segments, and an approximating function is specified for each segment. The most significant k bits of $x_f$ identify the segment. In an implementation, these bits will be used to address the storage unit holding the parameters of the approximating function. They will be called the address bits. The next m−k bits of $x_f$ specify the point within the approximating segment at which the evaluation is to take place. These will be called the interpolating bits.

Polynomial Approximation Segments

Consider the specific case of function evaluation in which the approximating functions are polynomials. Let $\Delta x = (a-b)*2^{-k}$ be the length of an approximating segment. For $i = 0, \ldots, 2^k - 1$, let segment i be defined by:

$$\{x \mid a + i\Delta x \leq x < a + (i+1)\Delta x\}.$$

Let $f_i(t) = f(a + i\Delta x + 5)$, and let $g_i(t)$ be an approximation to $f_i(t)$ for $0 \leq t \leq \Delta x$.

Suppose $g_i(t)$ is a polynomial of degree d, $$g_i(t) = \sum_{h=0}^{d} a_h(i) t^h. \tag{1}$$

Then the interpolating memory unit must hold at address i the coefficients $a_0(i), \ldots, a_d(i)$.

The hardware organization required for the straightforward interpolation by polynomial of degree d is shown in FIG. 1. The k address bits constitute the segment number i, and are used to address the memory unit holding the coefficients. The memory size is $2^k$ words. The m−k interpolating bits constitute the variable t. The $t^h$ values, $h = 2, \ldots, d$, are obtained in combinational logic in parallel with the memory read. The products $a_h(i)t^h$ are obtained in parallel multiply units, the bit widths of which are usually less than that of the result. The products are combined in the final adder.

The time required for a function evaluation is the sum of the memory access time, the time for the widest multiplication, and the delay in the adder. The exact timing values, and the quantitative hardware requirements (the bit widths of the coefficients and the multipliers), are determined by the precision required of the result. However, a given precision of the result can be obtained in various combinations of d and k. The precision is determined by the error of the polynomial approximation.

III. ERROR OF THE POLYNOMIAL APPROXIMATION

Let $g_i(t)$ be a polynomial of degree d approximating $f_i(t)$ over segment i. Let $$e_i(t) = |f_i(t) - g_i(t)|.$$

The error of a given type of approximating function is defined to be the maximum absolute error over all the segments of the evaluation interval. For $2^k$ segments, let $$E_k = \max_{0 \leq i < 2^k} \left( \max_{0 \leq t \leq \Delta x} e_i(t) \right). \tag{3}$$

$E_k$ is actually an upper bound on the error of the device, since it is the maximum error of the continuous approximating functions, and the interpolating memory evaluates these functions only at discrete points.

Precision

The precision of a quantity is the number of bits in its binary representation. If bounds on the error of a quantity are known in the design phase, the precision can be specified so as not to introduce additional error, and not to implement meaningless bits. In considering the implementation of a quantity whose error can be bounded, I will use the term "precision" to refer to the most reasonable implementation of the quantity. The fixed-point precision of the result will be said to be to bit q if the error is not more than the value of bit position q. That is, if $$E_k \leq 2^q \text{ or } q \leq \log_2(E_k).$$

The complete precision is determined by the msb position, which depends on the maximum possible magnitude of the quantity, as well as by the fixed-point precision.

Precision as a Function of Number of Address Bits

Figure 2A:
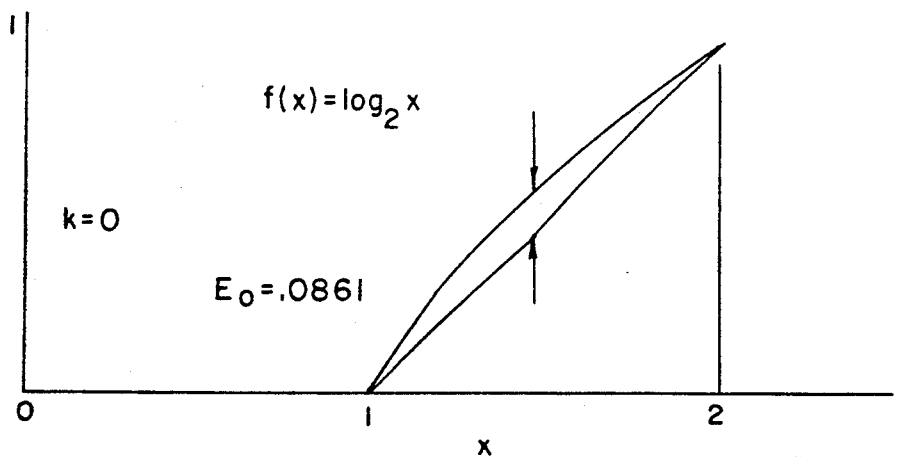
FIGS. 2A, 2B and 2C are graphic representations of error of $\log_2 x$ with linear interpolation.
Figure 2B:
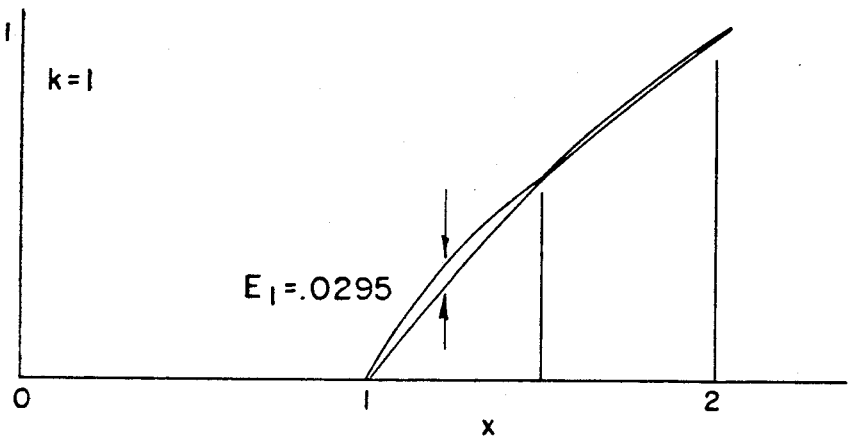
Figure 2C:
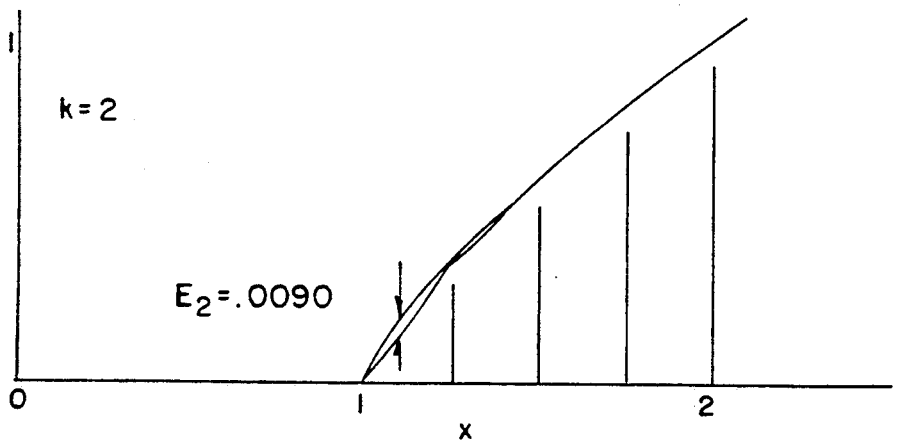

If k bits are used to address the memory unit holding the coefficients, the function is evaluated over $2^k$ segments. As an example, consider the evaluation of $\log_2 x$, for $1 \leq x < 2$, by means of the linear Lagrange interpolation. The Lagrange interpolating polynomial of degree d coincides with the function value at $d+1$ evenly spaced points in the approximating segment. FIG. 2 shows $E_k$ for the cases $k=0, 1, 2$.

Figure 3:
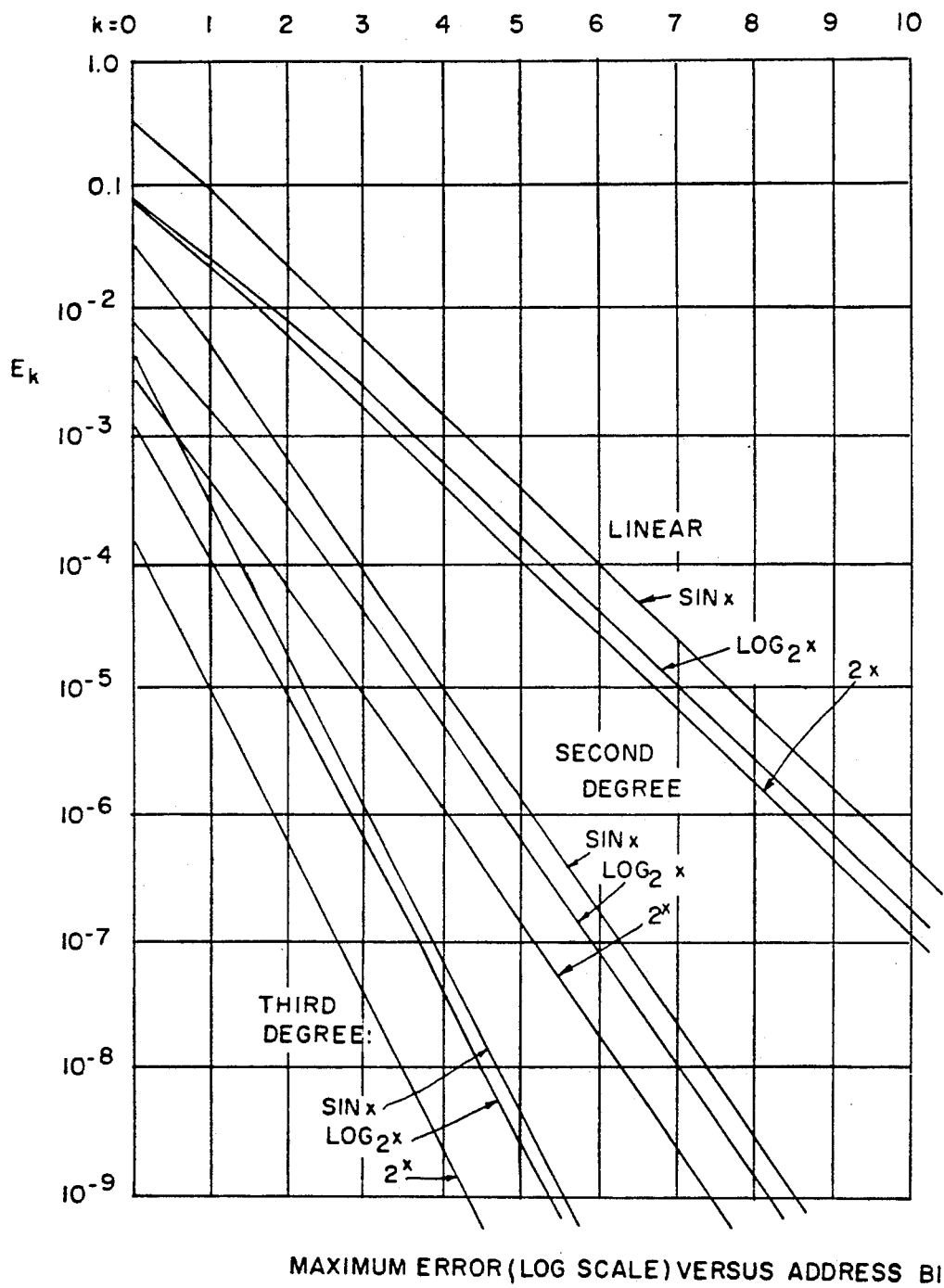
FIG. 3 is a representation of maximum error (log scale) versus address bits k.

$E_k$, for Lagrange polynomial approximations to $\log_2 x$, is plotted on a logarithmic scale in FIG. 3. Also plotted are the error characteristics for the functions $2^k$, evaluated for $0 \leq x < 1$, and $\sin(x)$, evaluated for $0 \leq x < 2$. The cases $d=1, 2,$ and $3$ are given for each function.

The error characteristic in each case approaches a linear asymptote on the logarithmic scale. The slope of this asymptote is the same for each of the functions, and depends only on the value of d. For linear approximations, $E_k$ is reduced by a factor of four for each increment of k on the linear portion of the characteristic.

For the second and third degree approximations, the error is reduced by factors of 8 and 16, respectively, for each additional address bit. In general, it seems that for an approximating polynomial of degree d, the precision of the result (as determined by the error) is increased by $d+1$ bits for each added address bit. In the next section, this result will be shown to hold for the Lagrange polynomial approximation to any function that has $d+1$ derivatives.

The Lagrange polynomial is easy to compute and is amenable to analysis, but other polynomial approximations yield smaller errors. If a least-squares polynomial is used, the resulting plot of $E_k$ is virtually the same as FIG. 3, except that each curve is displaced downward, representing a further reduction of $E_k$ by a factor of 1.5 to 2.

IV. ERROR BOUND FOR THE LAGRANGE APPROXIMATION

The existence of an error bound for the Lagrange interpolating polynomial is well known. Here, we extend the result to show the error bound as a bound on precision, and the bound on precision as a function of the number of address bits of the interpolating memory.

Let $g_i(t)$ be the Lagrange interpolating polynomial of degree d approximating $f_i(t)$ over interval i, $0 \leq t \leq \Delta x$. Then $g_i(t_j) = f_i(t_j)$ at the evenly spaced points $t_j = j\Delta x/d$ for $j = 0, \ldots, d$. It is shown in O2 that as long as $f_i(t)$ has $d+1$ derivatives, the error of the degree-d Lagrange approximation is bounded as follows:

$$\max_t |e_i(t)| \leq \frac{1}{(d+1)!} \max_t |f_i^{(d+1)}(t)| \max_t \left| \prod_{j=0}^{d} (t - t_j) \right|. \quad (5)$$

for $0 \leq t \leq \Delta x$.

With the variable change $y = t/\Delta x$, the product term in (5) may be rewritten:

$$\max_{0 \leq t \leq \Delta x} \left| \prod_{j=0}^{d} (t - t_j) \right| = \max_{0 \leq y \leq 1} \prod_{j=0}^{d} |(y - j/d)\Delta x| = \quad (6)$$

$$(\Delta x)^{d+1} Q(d)$$

where $$Q(d) = \max_{0 \leq y \leq 1} \prod_{j=0}^{d} |(y - j/d)|. \quad (7)$$

Then (5) becomes $$\max_t |e_i(t)| \leq \frac{(\Delta x)^{(d+1)}}{(d+1)!} \max_t |f_i^{(d+1)}(t)| Q(d). \quad (8)$$

The maximum error over the entire interval is the maximum of (8) over $i = 0, \ldots, 2^k - 1$. Since $\Delta x = 2^{-k}(b-a)$, one may write:

$$E_k \leq \frac{2^{-(d+1)k}}{(d+1)!} (b-a)^{d+1} \max_{0 \leq x \leq b} |f^{(d+1)}(x)| Q(d). \quad (9)$$

Since the maximum error of the degree-d Lagrange polynomial approximation has a bound that it proportional to $2^{-(d+1)k}$, the allowable precision of the result (lsb position) is proportional to $-(d+1)k$. Furthermore, this characteristic will hold for any function that had $d+1$ derivatives over the domain of interest. In the next section, I show how the hardware requirements are determined from the specified precision of the result. This will allow the design of interpolating memories, implemented in RAM, that may be used for a broad class of functions.

V. HARDWARE REQUIREMENTS

A method is presented for determining the widths of the data paths for the computation of f(x), given a specification of the maximum error (or the required precision) of the result. The data path widths determine the hardware required for the arithmetic logic and the memory of coefficients. Signed magnitude representations are assumed for all quantities. One's-and two's-complement representations will have almost exactly the same hardware requirements. The storage and manipulation of sign bits is not explicitly considered.

It is assumed that f(x) is to be evaluated over [a, b), where $b - a = 2^n$, and that a is a multiple of $2^n$. Only bits less significant than bit n in the binary representation of x vary over the domain of interest. Let bit $n-m$ be the lowest order implemented bit of x. It is also assumed that the argument x has no error: all bits of lower order than bit $n-m$ are identically zero. The notations used for the relevant bit positions are shown in FIG. 4.

Step 1. Determine $q_v$ and $q_u$, respectively the lsb and msb positions of $f(x) = g_i(t)$. Assume that the design requirements for an interpolating memory are given in terms of either the specification of the least significant bit position $q_v$ of the result, or else a bound E on the absolute error. Then $$E \leq 2^{q_v}. \quad (10)$$

Note that if the magnitude of f(x) is to be specified in bits $q_u$ to $q_v$, where $q_u \geq q_v$, $$\max_x |f(x)| \leq 2^{q_u} + 1 - 2^{q_v}, \quad (11)$$

which leads to $$q_u = \lceil \log_2(\max_x |f(x)| + 2q_v) \rceil - 1. \quad (12)$$

Step 2. Determine d, the degree of $g_i(t)$, and k, the number of address bits for the memory of coefficients. Since various designs are possible through tradeoffs of d and k, one parameter must be specified independently. A range of designs can be evaluated as d is varied.

For any function with continuous derivatives, the characteristic of precision as a function of k has the form shown in FIG. 3. For each of these curves, the straight-line asymptote is also a bound on the error. This bound is $$\log_2 E_k \leq \log_2 E_{OL} - (d+1)k \quad (13)$$

The $E_{OL}$ value is determined by evaluating the maximum $E_k$ for any value of k larger than all design possibilities, and projecting a line of slope $-(d+1)$ through the point obtained, to k=0. Alternatively, for Lagrange interpolating polynomials, the bound may be obtained by taking the logarithm of (9).

Since the result will include roundoff error of one half lsb, the error of the approximation must be limited to half the value of bit $q_u$. Then, to ensure $\log_2 E_k < q_v - 1$, set $$\log_2 E_{OL} - (d+1)k < q_v - 1 \quad (14)$$

and solve for the minimum integer value of either d or k.

Step 3. Determine $r_v$, the lsb position of all terms $a_h t^h$, for $h = 0, 1, \ldots, d$. An error of half the lsb value may result from rounding the sum of the polynomial terms. Therefore, the error of the sum must not be greater than $2^{q_v-1}$, and thus the error of each of the d+1 terms must not be greater than $2^{q_v-1}/(d+1)$. Then, $$2^{r_v} \leq \frac{2^{q_v} - 1}{d + 1}, \quad (15)$$

from which the largest value of $r_v$ is determined:

$$r_v = q_v - 1 - \lceil \log_2(d+1) \rceil. \quad (16)$$

For h=0, steps 5 and 6 are performed. Steps 4–8 are performed for h=1, ..., d.

Step 4. Determine $s_u$ the msb position of $t^h$. Since t is specified in bits n−k−1 to n−m, $t^h$ will be specified in bits h(n−k)−1 to h(n−m). Therefore, $$s_u = h(n-k) - 1. \quad (17)$$

Note that the lowest order bit of $t^h$ that must be implemented is bit h(n−m). Hence, $$s_v \geq h(n-m). \quad (18)$$

Step 5. Determine $w_v$, the lsb of $a_h$. For h=0, $w_v = r_v$. For h>0, the effect of the multiplication $a_h t^h$ must be considered. In the Appendix, it is shown that the precision of a product is determined by the following rule. If A and B are unsigned numbers specified in bit positions $a_u$ to $a_v$ and $b_u$ to $b_v$, respectively, with errors not greater than half the lsb value, then C=AB may be specified in bits $c_u$ to $c_v$, where $c_u = a_u + b_u + 1$, and $$c_v \geq a_v + b_u + 2, \quad (19a)$$

$$c_v \geq a_u + b_v + 2, \quad (19b)$$

and the error of C is not greater than the lsb value.

In the current case, it is assumed that the only error of $a_h$ and the argument x is the roundoff error, which is bounded by half the lsb value. Then, applying the rule (19a) to the product $a_h t^h$, $$r_v \geq w_v + s_u + 2. \quad (20)$$

The largest lsb is $$w_v \leq r_v - s_u - 2.$$

Step 6. Determine $w_u$, the msb of $a_h$. Following the rule in Step 1, $$w_u = \lceil \log_2(\max_i |a_h(i)| + 2^{w_v}) \rceil - 1. \quad (22)$$

Step 7. Determine $s_v$, the lsb of $t^h$. Applying the rule (19b) to $a_h t^h$, $$r_v \geq w_u + s_v + 2, \quad (23)$$

from which the largest possible $s_v$ value is determined to be $r_v - \Omega_u - 2$. But as noted in Step 4, bits of $t^h$ that are of lower order than bit h(n−m) are identically zero. Therefore, $$s_v = \max(r_v - w_u - 2, h(n-m)). \quad (24)$$

Step 8. Determine $r_u$ the msb position of $a_h t^h$. In the Appendix, it is shown that as long as the product is rounded to $r_v$, satisfying (21) and (23), then $$r_u = s_u + w_u + 1. \quad (25)$$

Two particular examples of interpolating memory design are presented in the next section.

VI. EXAMPLES OF DESIGN

Consider the evaluation of $\log_2(x)$ for $1 \leq x < 2$. In this case $\Delta x = 1$, and n = 0. Assume x is specified to 14 fixed-point precision (m = 14), and $\log_2(x)$ is also to be given to 14-bit precision. Suppose the approximation is by means of linear segments, fitted by the least-squares criteria. The hardware requirements are computed by the algorithm of the previous section.

Step 1. We assume $q_v = -14$ is a design requirement. The error of f(x) is bounded by $E \leq 2^{-14}$. Then (12) yields $q_u = 0$.

Step 2. We consider linear (d=1) approximating polynomials. The bound $E_{OL} = 0.084$ is obtained from the linear, least-squares error characteristic (similar to FIG. 3) for the log function. Then (14) yields $k \geq 5.71$. The smallest possible memory for 14- precision has k=6, or 64 addresses.

Step 3. For the d=1 case, (16) yields $r_v = -16$.

Step 5 (h=0). Set $w_v = r_v = -16$.

Step 6 (h=0). Since there are $2^6$ segments for the proposed design, the last segment, which yields the largest value of $a_0$, will begin at $x = 2 - 2^{-6}$. Then max $a_0 = log_2(2 - 2^{-6}) = 0.977$. Then (22) yields $$w_u = log_2[(0.977 + 2^{-16})] - 1 = -1.$$

Step 4 (h=1). Equation (17) yields $S_u = -7$. Also, $s_v \geq -14$.

Step 5 (h=1). By (21), $w_v = -11$.

Step 6 (h=1). By (22), $$w_u = \lceil log_2 (1.44 + 2^{-11}) \rceil - 1 = 0.$$

Step 7 (h=1). By (24), $s_v = -14$.

Step 8. By (25), $r_u = -6$.

Thus, a 64-word memory is required. The word width is 28 bits: 16 bits for the $a_0$ values, and 12 bits for the $a_1$ values. The multiply unit is $12 \times 8$ bits.

Example of Higher Degree Interpolation

In this example, we consider a range of design possibilities for the computation of sin (x) to a fixed-point precision of 48 bits. Since the argument x must be evaluated between 0 and $\pi/2$, a value of $\Delta x = 2$ is chosen, and n=1. Assume x is specified to 48-bit precision (m=48).

Steps 1 and 2 of the design algorithm yield $q_v = -48$ (the design requirement), $|E| \leq 2^{-48}$, and $q_u = 0$. The algorithm is applied to evaluate the design choices d=2, 3, and 4.

The least-squares error characteristic for sin (x), for d=2, yields $log_2 E_{OL} = -4.65$. Then k=15 is obtained in step 3. A memory unit of 32K words is required.

Applying the remainder of the algorithm yields the design parameters shown in Table I. The memory word width is 113 bits, for a total memory requirement of 3616K bits. Two multipliers are required: $39 \times 33$ bits and $23 \times 23$ bits.

For d=3, the least-squares error characteristic shows $log_2 E_{OL} = -7.75$. Then Step 3 yields k=11. A memory unit with 2K words is required. Table II gives the remainder of the design parameters. The memory word length is seen to be 146 bits, for a total memory requirement of 292K bits. Three multipliers are required: $43 \times 38$ bits, $32 \times 32$ bits, and $20 \times 20$ bits.

For d=4, the error characteristic shows $log_2 E_{OL} = -10.75$, from which k=8 is determined in Step 3. A 256-word memory is required. The remaining design parameters are given in Table III. The word width is seen to be 187 bits, for a total memory requirement of 47K bits. Four multipliers are required: $46 \times 40$ bits, $38 \times 38$ bits, $30 \times 30$ bits, and $21 \times 21$ bits.

VII. COMPARISONS TO OTHER METHODS

The interpolating memory is a generalization of the table-lookup and the linear and quadratic approximation methods of [1]-[5]. These works describe limited-precision and restricted (one function only) versions of the present technique. Iterative techniques [10], [11] require an order of magnitude greater computation time, and so are not directly comparable. The difference-grouping PLA (DGPLA) of Lo and Aoki is a noniterative function evaluation unit, capable of evaluating the log function. The timing and hardware requirements of the interpolating memory and the DGPLA will be compared.

The time required for a function evaluation by an interpolating memory may be observed in FIG. 1. The generation of the required powers of t is overlapped with the memory access for the polynomial coefficients. All of the multiplications are performed in parallel. With array multipliers, the time for m-bit multiplication is bounded by the delay of 2m full adders [14]; but in this case the widest multiplier is even less than m bits. The time for the final addition is largely overlapped with the multiplication time. Thus, the time for a function evaluation is the sum of the access time of a memory of k address bits, followed by 2m full adder stages.

The time requirement of the DGPLA is of a similar order. The DGPLA consists of a PLA followed by one addition stage. The PLA has only a three-gate delay. However, use of the PLA limits the precision of the unit to the fan-in of one gate. For higher precision designs, a ROM, with m address bits, is required. For the 14-bit implementation discussed below, the interpolating memory access time is estimated to be about twice as great as that of the DGPLA. The timing estimates are made without the use of additional speedup logic, such as carry-lookaheads (from which both devices could benefit) and redundant encodings for the multiplications [14].

Comparison of the hardware requirements of the interpolating memory and the DPGLA is problematic because the interpolating memory scheme admits of a variety of implementations, with tradeoffs of logic and memory. And the measure of memory for a PLA is qualitatively different from that of a RAM or ROM, even though both are expressed in bits. With these reservations, the interpolating memory is compared to the DGPLA, for the 14-bit logarithm implementation of Section VI. The interpolating memory requires 1.8K bits of memory. In addition, it requires a $12 \times 8$ bit multiplier, and a 16 bit adder; a total of 112 full adders.

Using the technique for measuring the PLA size given in [9], the DGPLA requires 110K programmable PLA bits for a 14-bit precision implementation of the log function. However, if the error terms are produced by a ROM, the unit would require $2^{14}$ addresses, and have a word size of 11 bits, for a total memory of 176K bits. The final stage requires 14 full adders.

VIII. CONCLUSIONS

It has been shown that the precision of a degree-d polynomial approximation of any function that has d+1 derivates increases linearly with the number of bits used to address the interpolating memory. Then it is possible to design an interpolating memory for any specified precision with a variety of tradeoffs of memory and arithmetic logic (i.e., polynomial degree).

Suppose the argument is given to m-bit precision. Possible designs range from the case of $k=m$, which is simply a lookup table of size $2^m$, to $k=0$, in which the function is computed from a single set of polynomial coefficients.

Because the slope of the precision characteristic is the same for any function with the required differentiability, a single unit may be designed to serve for a wide class of functions. The memory unit could be implemented in RAM and the contents switched for different functions. Or sections of a single unit, selected by one or more address bits, could be used for different functions. A RAM-based unit could be a central computing element in a multifunction arithmetic pipeline organization.

The only differences in the hardware requirements for the various functions are in the magnitudes of the function arguments and the polynomial coefficients. These quantities do not differ by more than a few bits for the most common functions. The procedure for the generalized design is simply to apply the design algorithm for each desired function independently, and then select for each quantity the maximum of the msb position and the minimum of the lsb positions.

APPENDIX

THE FIXED-POINT PRECISION OF MULTIPLICATION

Let the real numbers A and B have the finite-precision signed-magnitude binary representations $\hat{A}$ and $\hat{B}$, in which bits $a_u$ and $b_u$, respectively, are the msb's, and bits $a_v$ and $b_v$, respectively, are the lsb's. Let $e_a$ and $e_b$ be the respective errors of the representations: $A=\hat{A}+e_a$ and $B=\hat{B}+e_b$.

Consider the product $$C = AB = \hat{A}\hat{B} + e_{ab} \qquad (A1)$$

where $$e_{ab} = \hat{A}e_b + \hat{B}e_a + e_a e_b \qquad (A2)$$

is the error of the finite-precision product $\hat{A}\hat{B}$. Note that the largest nonzero bit of AB is in a position no greater than $a_u+b_u+1$, and the smallest nonzero bit in a position no less than $a_v+b_v$.

Let $\hat{C}$, with msb $c_u$ and lsb $c_v$, represent C. Let $e_c$ be the error of the representation: $\hat{C}=C+e_c$. $\hat{C}$ is obtained by rounding AB to bit position $c_v$. The error $e_r$ introduced by rounding is defined by:

$$\hat{C} = \hat{A}\hat{B} + e_r \qquad (A3)$$

Then from (A1) and (A3) is seen that $$|e_c| \leq |e_{ab}| + |e_r|. \qquad (A4)$$

But $max\ |e_r| = 2^{c_v-1}$. Then if $$max|e_{ab}| < 2^{c_v-1}, \qquad (A5)$$

the result $\hat{C}$ can be implemented to lsb $c_v$, with $|e_c| < 2^{c_v}$.

Consider the case in which initial representations of A and B can be obtained with high precision and negligible error. Then the errors of the representations A and B are rounding errors only: $e_a \leq 2^{a_v-1}$ and $e_b \leq 2^{b_v-1}$.

The maximum absolute values of A and B are $$max\ |A| = 2^{a_u+1} - 2^{a_v} \qquad (A6a)$$

and $$max\ |B| = 2^{b_u+1} - 2^{b_v}. \qquad (A6b)$$

Substituting these maximum values in to (A2), $$max\ |e_{ab}| = 2^{a_u+b_v} + 2^{a_v+b_u} - 2^{a_v+b_v} + 2^{a_v+b_v-2}, \qquad (A7)$$

from which $$max\ |e_{ab}| < 2^{max(a_u+b_v, a_v+b_u)+1}. \qquad (A8)$$

Replacing max $|e_{ab}|$ in (A5) with the bound in (A8), it is seen that C may be implemented to bit $$c_v \geq max\ (a_u-b_v, a_v+b_u) + 2, \qquad (A9)$$

with $|e_c| < 2^{c_v}$.

As another case, suppose A and B are obtained as a result of a process that has some error. Then the bounds $|e_a| < 2^{a_v}$ and $|e_b| < 2^{b_v}$ are a reasonable assumption. (In particular, this is the bound assumed for the result of the multiplication.) Reasoning as in (A6)-(A9) for this case leads to $$c_v \geq max\ (a_u+b_v, a_v+b_u) + 3. \qquad (A10)$$

To specify $c_u$, one must determine whether the rounding of AB may cause a carry through bit $a_u+b_u+1$. Let $n(c_v)$ be the smallest number represented in bit positions $a_u+b_u+1$ to $a_v+b_v$, such that when rounded to bit position $c_v$, a carry out of bit position $a_u+b_u+1$ will result. Clearly, $n(c_v)$ consists of ones from bit position $a_u+b_u+1$ to bit position $c_v-1$, and zeros in all lower bit positions:

$$n(c_v) = 2^{a_u+b_u+2} - 2^{c_v-1}.$$

If $\hat{A}\hat{B}$ is rounded to bit position $c_v$, carry overflow will not take place as long as $$max\ |\hat{A}\hat{B}| < n(c_v). \qquad (A11)$$

Using the maximum values in (A6), this condition becomes $$2^{a_u+b_v+1} + 2^{a_v+b_u+1} - 2^{a_v+b_v} 2^{2^{c_v-1}}. \qquad (A12)$$

With $a_u \geq a_v$ and $b_u \leq b_v$, (A12) holds if $$c_v < max\ (a_u+b_v, a_v+b_u) + 2. \qquad (A13)$$

Therefore, for the case in which the errors of $\hat{A}$ and $\hat{B}$ are bounded by half their lsb values, and $\hat{C}$ is $\hat{A}\hat{B}$ rounded to bit $c_v$ given by (A9), overflow from rounding does not take place, and $c_u = a_u + b_u + 1$.

But for the case in which the errors of A and B are bounded by their respective lsb's, and C is AB rounded to $c_v$ as given by (A10), overflow from rounding may take place, and $c_u = a_u + b_u + 2$.

While the invention has been described with reference to specific embodiments, modifications and variations may be constructed without departing from the scope of the invention, which is defined in the following claims.

TABLE I

| | Parameters for d = 2 | | | | | |
|---|---|---|---|---|---|---|
| h | $w_u$ | $w_v$ | $s_u$ | $s_v$ | $r_u$ | $r_v$ |
| 0 | −1 | −51 | | | | |
| 1 | 0 | −38 | −15 | −47 | −14 | −51 |
| 2 | −2 | −24 | −29 | −51 | −30 | −51 |

TABLE II

| | Parameters for d = 3 | | | | | |
|---|---|---|---|---|---|---|
| h | $w_u$ | $w_v$ | $s_u$ | $s_v$ | $r_u$ | $r_v$ |
| 0 | −1 | −51 | | | | |
| 1 | 0 | −42 | −11 | −48 | −10 | −51 |
| 2 | −1 | −32 | −21 | −52 | −21 | −51 |
| 3 | −3 | −22 | −31 | −50 | −33 | −51 |

TABLE III

| | Parameters for d = 4 | | | | | |
|---|---|---|---|---|---|---|
| h | $w_u$ | $w_v$ | $s_u$ | $s_v$ | $r_u$ | $r_v$ |
| 0 | −1 | −52 | | | | |
| 1 | −1 | −46 | −8 | −47 | −8 | −52 |
| 2 | −2 | −39 | −15 | −52 | −16 | −52 |
| 3 | −3 | −32 | −22 | −51 | −24 | −52 |
| 4 | −5 | −25 | −29 | −49 | −33 | −52 |

I claim:

1. An interpolating memory function evaluation apparatus, comprising: a memory address means for accessing a memory unit by using first bits of a function argument for the memory unit address, an approximating means for obtaining parameters of an approximating function from the memory unit, and an evaluating means for evaluating the approximating function, using other bits of the function argument, the specific approximating function whose parameters were obtained from the memory unit, wherein the accessing comprises using k bits of the function argument to address the memory unit wherein the memory unit contains polynomial coefficients, wherein the evaluating comprises evaluating with fixed combinational logic a degree d-polynomial whose coefficients are obtained from the memory unit, using as the polynomial argument the bits of the function argument of lower order than the k bits used to address the memory unit, wherein the evaluation of the polynomial is performed using as an input to a polynomial evaluator a value t comprised of bits of the function argument of lower order than the k bits used to address the memory unit, computing the quantities $t^2$, $t^3$, ..., $t^d$ in fixed combinational logic, computing terms of the polynomial in a set of multipliers operating in parallel, whose inputs are the coefficients obtained from the memory unit and the powers of t, and adding terms of the polynomial.

2. The apparatus of claim 1, further comprising accepting a floating-point function argument, with exponent field E and mantissa M, and using k function argument bits, including zero or more low order bits of E and zero or more high order bits of M as an address of a register set in a set-associative memory, performing an associative search in the associative memory set selected by the address, using the high order bits of E as the associative search key, obtaining from the memory location associated with a successful match in the associative memory, a floating-point exponent of a function value and the d+1 polynomial coefficients, evaluating the polynomial specified by the coefficients with polynomial argument specified as the low-order bits of M, and normalizing the floating-point value consisting of the exponent obtained from the memory and the mantissa obtained as a result of the polynomial evaluation.

3. The apparatus of claim 2, wherein a particular function to be evaluated is supplied as a function identification f, and the associative search key is comprised of both f and the high order bits of E.

4. An apparatus for evaluating floating-point functions, comprising a first input for inputting a function identification f, a second input for inputting an argument x in floating-point form with exponent E and mantissa M, means for supplying the function identification f input to a set-associative memory, means for supplying high order bits of E to the set-associative memory, means for supplying low order bits of E and high order bits of M to a set selection input of the associative memory, for selecting a portion of the associative memory, means for making an associative search in the selected portion of the memory with f and the high order bits of E, means for selecting, as a result of the associative search, a memory word containing polynomial coefficients and a floating-point exponent, means for supplying parallel outputs of a polynomial coefficients to a polynomial evaluation unit, means for supplying low order bits of M to the polynomial evaluation unit, means for supplying the floating-point exponent and an output of the polynomial evaluation unit to a floating-point normalization unit in obtaining floating-point representation of the function evaluation from the normalization unit M of the normalizer.

5. A floating-point interpolating memory, comprising a floating-point argument input having an exponent section and an mantissa section, a function identification input, a set-associative memory having a function input and an exponent input, the function input being connected to the function identification input, high order bits in the exponent section being connected to the exponent input of the set-associative memory, a set-selector connected to the set-associative memory, at least one of low order bits from an exponent register and high order bits from a mantissa register being connected to the set selector for selecting associative memory set from the set-associative memory, a word memory unit connected to the set-associative memory having words selected by an associative search in the selected set, the selected memory words including a floating-point exponent and polynomial coefficients, a polynomial evaluator connected to plural outputs of the word memory unit holding the polynomial coefficients, the polynomial evaluator having an input connected to low order bits from the input mantissa register, a floating-point normalization unit connected to an output of the polynomial evaluator and having an input connected to a floating-point exponent obtained from the word memory unit, the floating-point normalization unit having an output of the function evaluation.

* * * * *